(12) United States Patent
Gao (10) Patent No.: US 10,656,340 B2
(45) Date of Patent: May 19, 2020

(54) TERMINAL HAVING FINGERPRINT IDENTIFICATION FUNCTION

(71) Applicant: ZTE CORPORATION, Shenzhen, Guangdong Province (CN)

(72) Inventor: Yang Gao, Shenzhen (CN)

(73) Assignee: ZTE CORPORATION (CN)

(*) Notice: Subject to any disclaimer, the term of this patent is extended or adjusted under 35 U.S.C. 154(b) by 69 days.

(21) Appl. No.: 15/778,632

(22) PCT Filed: Mar. 25, 2016

(86) PCT No.: PCT/CN2016/077383
§ 371 (c)(1),
(2) Date: May 24, 2018

(87) PCT Pub. No.: WO2016/177174
PCT Pub. Date: Nov. 10, 2016

(65) Prior Publication Data
US 2018/0348438 A1     Dec. 6, 2018

(30) Foreign Application Priority Data
Nov. 25, 2015 (CN) .................... 2015 2 0953314 U (51) Int. Cl.
*G02B 26/08* (2006.01)
*G02B 6/35* (2006.01)
(Continued)

(52) U.S. Cl.
CPC ......... *G02B 6/3564* (2013.01); *G02B 6/0073* (2013.01); *G06K 9/00* (2013.01); *G06K 9/00033* (2013.01); *G06K 9/00046* (2013.01)

(58) Field of Classification Search
CPC ............... G02B 6/3564; G02B 6/0073; G06K 9/00046; G06K 9/00033; G06K 9/00
(Continued)

(56) References Cited

U.S. PATENT DOCUMENTS 5,187,748 A      2/1993  Lee
2003/0169905 A1  9/2003  Butterworth
(Continued)

FOREIGN PATENT DOCUMENTS

CN     101276406 A    10/2008
CN     204028941 U    12/2014
(Continued)

OTHER PUBLICATIONS

Office Action dated Jun. 11, 2019; Japanese Patent Application No. 2018-527090.

*Primary Examiner* — Euncha P Cherry
(74) *Attorney, Agent, or Firm* — McDonald Hopkins LLC (57) ABSTRACT

Disclosed is a terminal having a fingerprint identification function, including: a body having a camera (1) and a processing unit, the camera (1) being electrically connected to the processing unit; an optical lens assembly, used to change a focal length of the camera (1), located above the camera (1), and mounted on the body; a light-guiding fingerprint capture platform, located above the optical lens assembly, and used cooperatively with the optical lens assembly; and a light source (2), located between the camera (1) and the fingerprint capture platform and aside the camera (1), a light emitting end of the light source (2) facing the fingerprint capture platform.

18 Claims, 5 Drawing Sheets

(51) Int. Cl.
*G06K 9/00* (2006.01)
*F21V 8/00* (2006.01)

(58) Field of Classification Search
USPC ..................................................... 359/223.1
See application file for complete search history.

(56) References Cited

U.S. PATENT DOCUMENTS

| | | | |
|---|---|---|---|
| 2004/0041998 A1 | 3/2004 | Haddad | |
| 2004/0120552 A1 | 6/2004 | Borngraber et al. | |
| 2008/0260365 A1 | 10/2008 | Chang | |
| 2008/0267463 A1* | 10/2008 | Yuan | G06K 9/00046 |
| | | | 382/124 |

FOREIGN PATENT DOCUMENTS

| | | |
|---|---|---|
| CN | 104537349 A | 4/2015 |
| EP | 2811738 A2 | 12/2014 |
| JP | 2004-64499 A | 2/2004 |
| JP | 2006-81113 A | 3/2006 |
| JP | 200734809 A | 2/2007 |
| KR | 20040042727 A | 5/2004 |
| WO | 2004081852 A1 | 9/2004 |

\* cited by examiner

TERMINAL HAVING FINGERPRINT IDENTIFICATION FUNCTION

CROSS-REFERENCE TO RELATED APPLICATIONS

The present application is a U.S. National Phase Entry of International PCT Application No. PCT/CN2016/077383 having an international filing date of Mar. 25, 2016, which claims priority to Chinese Patent Application No. 201520953314.3 filed on Nov. 25, 2015. The present application claims priority and the benefit of the above-identified applications and the above-identified applications are incorporated by reference herein in their entirety.

TECHNICAL FIELD

The present application relates to, but is not limited to, the technical field of electronic devices.

BACKGROUND

In a mobile phone, fingerprints can only be identified and processed after a fingerprint image is captured by a fingerprint capture device. The quality of the fingerprint image directly affects the identification accuracy and the processing speed of a fingerprint identification system. Therefore, fingerprint capture is a key technology for fingerprint identification.

Main fingerprint capture technologies used nowadays include an optical fingerprint capture technology, a semiconductor fingerprint capture technology and an ultrasonic fingerprint capture technology.

Apple uses a silicon capacitive fingerprint image sensor, which is the most common semiconductor fingerprint sensor (semiconductor fingerprint capture technology), for capturing fingerprints through electronic scales. About 100,000 capacitive sensors can be combined on a semiconductor metal array with an insulating outside surface. Each point of the sensor array is a metal electrode that acts as an electrode of a capacitor, a corresponding point of a fingertip on a sensing surface serves as the other electrode, and the sensing surface forms a dielectric layer between the two electrodes. Since the distances between a groove and a valley of the fingerprint and the other electrode are different (the presence of the depths of lines), a value of each capacitance of a silicon surface capacitance array is different, and the capacitance value of each point is measured and recorded, so that a fingerprint image with gray scale may be obtained.

A fingerprint scanning apparatus and a fingerprint identification chip correspond to the optical fingerprint capture technology, the fingerprint identification chip is connected to a mobile phone circuit board by wire signals. The optical fingerprint capture technology is the oldest and most widely used fingerprint capture technology currently, and the principle is the total reflection of light. Fingerprints have grooves and valleys. After light is irradiated to the valley by glass, total reflection occurs at an interface between the glass and air. The light is reflected to a Charge Coupled Device (CCD), and total reflection does not occur to the light that is directed at the groove, but is absorbed by a contact surface of the groove and the glass or diffused to other places. Thus, a fingerprint image is formed on the CCD.

The ultrasonic fingerprint image capture technology has not been applied to a fingerprint identification system because of the high cost.

Table 1 shows a comparison of the three main technologies.

| | Optical scanning technology | Semiconductor sensing technology | Ultrasonic scanning technology |
|---|---|---|---|
| Imaging capability | A dry finger has a poor imaging capability, and imaging of a finger that is sweaty and swollen is fuzzy. The imaging capability is easily affected by dirt and grease on skin. | A dry finger has a good imaging capability, and imaging of a finger that is wet and rough is achieved. The imaging capability is easily affected by dirt and grease on skin. | Very good |
| Imaging area | Large | Small | Medium |
| Resolution | Lower than 500 dpi | Up to 600 dpi | Up to 1000 dpi |
| Device size | large | small | Medium |
| Durability | Very high | High | Medium |
| Power consumption | High | Low | High |
| Cost | High | Medium | Very high |

As can be seen from Table 1, the above three methods have high costs, and application to a mobile phone will undoubtedly increase the sales price of the mobile phone, which is not conducive to mobile phone sales.

SUMMARY

The following is a brief introduction for a subject described herein in detail. The brief introduction is not intended to restrict the scope of protection of claims.

The present disclosure provides a terminal having a fingerprint identification function, capable of better reducing the manufacturing cost of a fingerprint identification module.

A terminal having a fingerprint identification function includes: a body having a camera and a processing unit, the camera being electrically connected to the processing unit; an optical lens assembly, used to change a focal length of the camera, located above the camera, and mounted on the body; a light-guiding fingerprint capture platform, located above the optical lens assembly, and used cooperatively with the optical lens assembly; and a light source, located between the camera and the fingerprint capture platform and aside the camera, a light emitting end of the light source facing the fingerprint capture platform.

In an exemplary embodiment, the terminal having a fingerprint identification function further includes: a light guide member, mounted between the fingerprint capture platform and the light source.

In an exemplary embodiment, the terminal having a fingerprint identification function further includes: a sliding rail, located on the body, the optical lens assembly being movably mounted on the sliding rail, the fingerprint capture platform being fixedly mounted on the optical lens assembly, and the light guide member being mounted on the optical lens assembly in a penetration manner, herein when the optical lens assembly carries the fingerprint capture platform and the light guide member to move along the sliding rail to a first set location, the optical lens assembly and the fingerprint capture platform are located right above the camera, and the light guide member is located right above the light source; and when the optical lens assembly carries the fingerprint capture platform and the light guide member to move along the sliding rail to a second set location, the optical lens assembly and the fingerprint capture platform are located aside a place right above the camera, and the light guide member is located aside a place right above the light source.

In an exemplary embodiment, the terminal having a fingerprint identification function further includes: a switch, located aside the camera, and electrically connected to the processing unit, herein when the optical lens assembly carries the fingerprint capture platform and the light guide member to move along the sliding rail to a first set location, the optical lens assembly comes into contact with the switch to turn the switch on; and when the optical lens assembly carries the fingerprint capture platform and the light guide member to move along the sliding rail to a second set location, the optical lens assembly is separated from the switch to turn the switch off.

In an exemplary embodiment, the terminal having a fingerprint identification function further includes: a limiting member, mounted at an end of the sliding rail, to stop the optical lens assembly from slipping off the sliding rail.

In an exemplary embodiment, the switch is a toggle switch, the light source is an LED flashlight, and the limiting member is a limiting plate.

In an exemplary embodiment, the optical lens assembly includes: a sliding support having a first through-hole, movably mounted on the sliding rail; and an optical lens, mounted in the first through-hole.

In an exemplary embodiment, the fingerprint capture platform includes: a light-guiding platform support, mounted on the sliding support; and light-guiding platform glass, mounted on the platform support.

In an exemplary embodiment, the platform support is provided with a second through-hole, corresponding to the first through-hole.

In an exemplary embodiment, the platform glass is optical glass, the optical lens is a wide-angle lens, the first through-hole is cylindrical, and the second through-hole is flared.

Embodiments of the present disclosure provide the terminal having a fingerprint identification function. An optical lens assembly is added in front of a camera, and the optical lens assembly zooms in with the camera to realize super macro shooting by the camera, so that a finger is placed on a fingerprint capture platform at the front end of the optical lens assembly, and a fingerprint image is shot by exposure compensation on the finger via a light source, so as to enable a processing unit to capture fingerprints and complete follow-up fingerprint identification. That structure is easy to implement, and the cost is low.

After the drawings and the detailed descriptions are read and understood, other aspects may be understood.

BRIEF DESCRIPTION OF DRAWINGS

Herein, a corresponding relationship between reference numbers and component names in FIG. 1 to FIG. 5 is.

1, camera; 2, light source; 3, light guide member; 4, sliding rail; 5, switch; 6, limiting member; 71, sliding support; 72, optical lens; 81, platform support; 82, platform glass.

DETAILED DESCRIPTION

Embodiments of the present disclosure will be described below in detail with reference to the accompanying drawings. It should be noted that the embodiments in the present application and the features in the embodiments may be combined with each other arbitrarily without conflict.

The terminal having a fingerprint identification function in some embodiments of the present disclosure will be described below with reference to the drawings.

Figure 1:
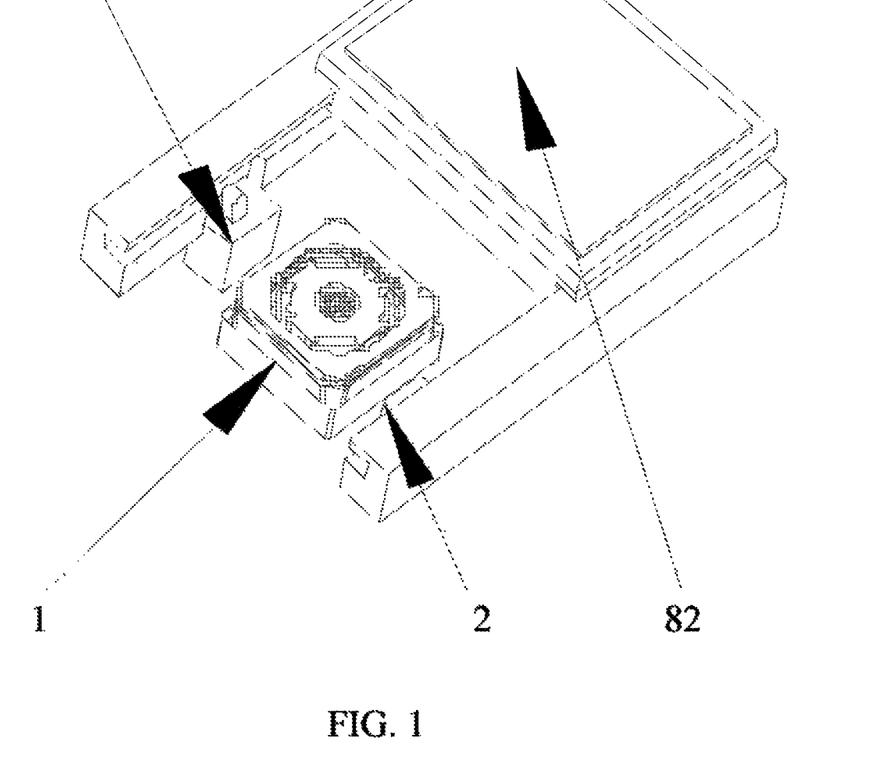
FIG. 1 is a schematic structure diagram of a usage state of a terminal having a fingerprint identification function according to an embodiment of the present disclosure.
Figure 2:
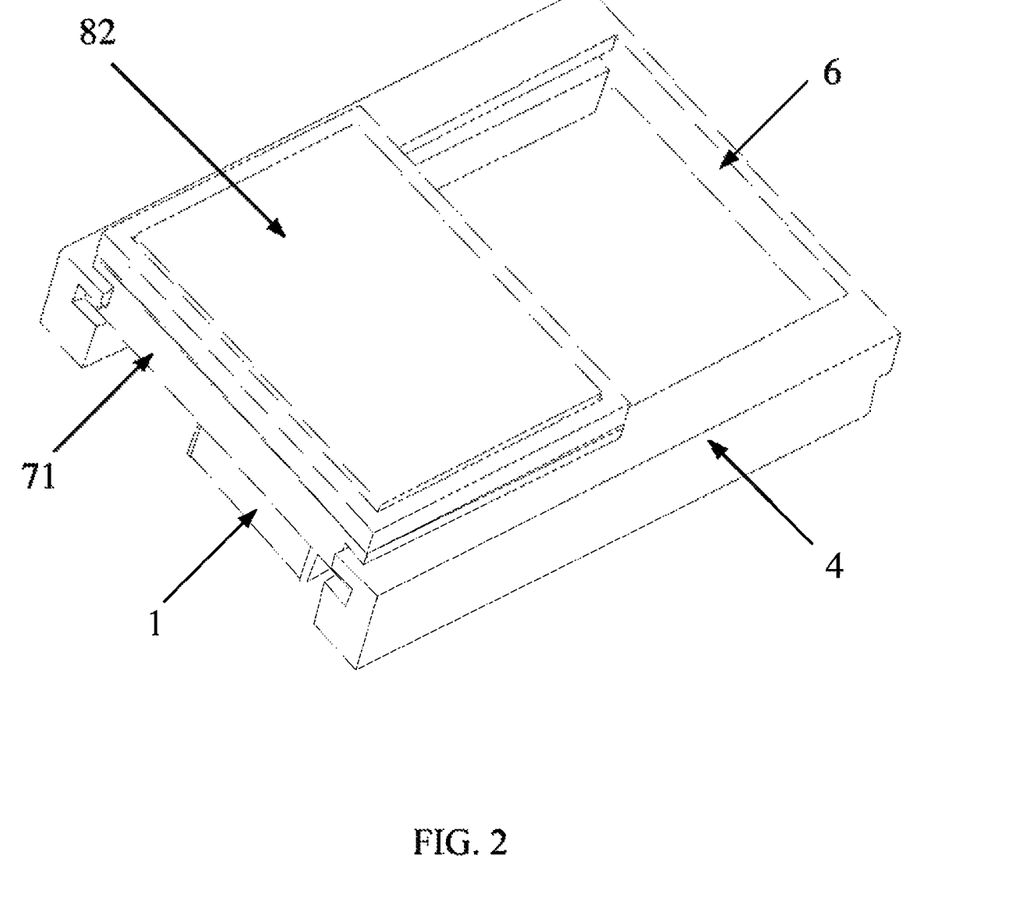
FIG. 2 is a schematic structure diagram of another usage state of a terminal having a fingerprint identification function according to an embodiment of the present disclosure.
Figure 3:
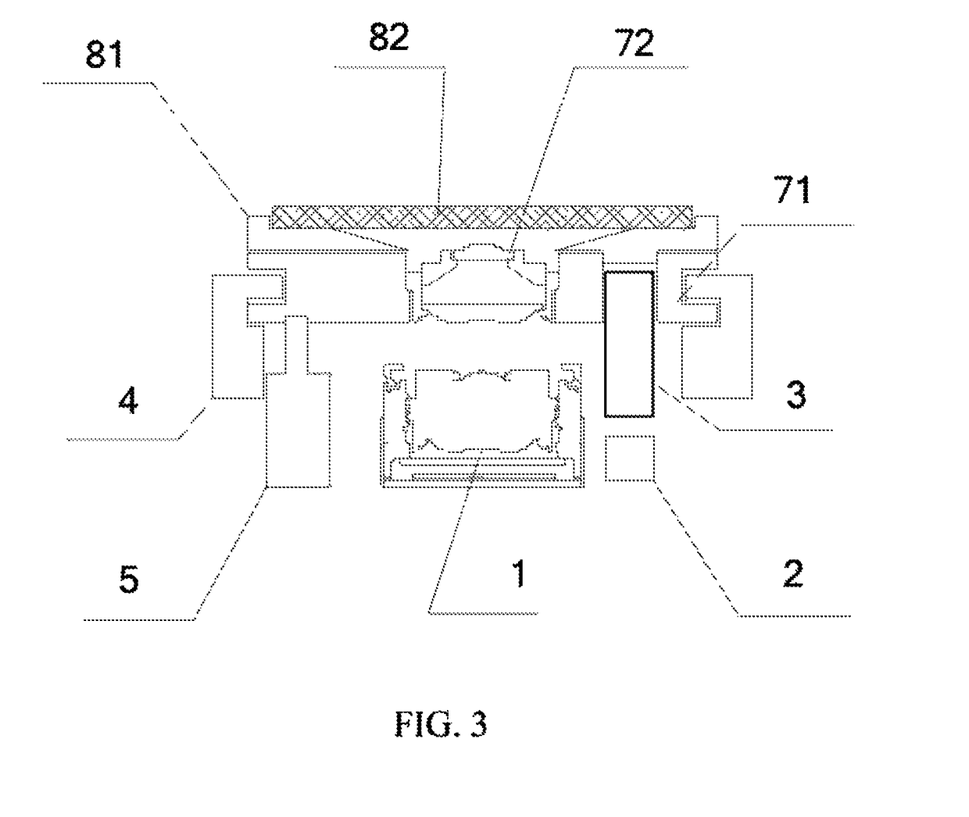
FIG. 3 is a sectional schematic structure diagram of a terminal having a fingerprint identification function shown in FIG. 1 and FIG. 2.

As shown in FIG. 1 to FIG. 3, the terminal having a fingerprint identification function provided by an embodiment of the present disclosure includes: a body having a camera 1 and a processing unit, the camera 1 being electrically connected to the processing unit; an optical lens assembly, used to change a focal length of the camera 1, located above the camera 1, and mounted on the body; a light-guiding fingerprint capture platform, located above the optical lens assembly, and used cooperatively with the optical lens assembly; and a light source 2, located between the camera 1 and the fingerprint capture platform and aside the camera 1, a light emitting end of the light source 2 facing the fingerprint capture platform.

According to the terminal having a fingerprint identification function provided by an embodiment of the present disclosure, an optical lens assembly is added in front of a camera 1, and the optical lens assembly zooms in with the camera 1 to realize super macro shooting by the camera, so that a finger is placed on a fingerprint capture platform at the front end of the optical lens assembly, and a fingerprint image is shot by exposure compensation on the finger via a light source 2, so as to enable a processing unit to capture fingerprints and complete follow-up fingerprint identification. That structure is easy to implement, and the cost is low.

Herein, the terminal may be a mobile phone, a tablet computer or a fingerprint machine.

In addition, the terminal having a fingerprint identification function provided by an embodiment of the present disclosure may also have the following additional technical features.

Herein, as shown in FIG. 3, the terminal having a fingerprint identification function further includes: a light guide member 3, mounted between the fingerprint capture platform and the light source 2, and used to guide light emitted from the light source 2 to the fingerprint capture platform.

As shown in FIG. 1 to FIG. 3 and FIG. 5, the terminal having a fingerprint identification function further includes: a sliding rail 4, located on the body, the optical lens assembly being movably mounted on the sliding rail 4, the fingerprint capture platform being fixedly mounted on the optical lens assembly, and the light guide member 3 being mounted on the optical lens assembly in a penetration manner.

Herein, as shown in FIG. 2, when the optical lens assembly carries the fingerprint capture platform and the light guide member 3 to move along the sliding rail 4 to a first set location, the optical lens assembly and the fingerprint capture platform are located right above the camera 1, and the light guide member 3 is located right above the light source 2; and when the optical lens assembly carries the fingerprint capture platform and the light guide member 3 to move along the sliding rail 4 to a second set location, the optical lens assembly and the fingerprint capture platform are located aside a place right above the camera 1, and the light guide member 3 is located aside a place right above the light source 2.

The first location and the second location are correspondingly located at two ends of the sliding rail 4.

As shown in FIG. 1 to FIG. 3 and FIG. 5, the terminal having a fingerprint identification function further includes: a switch 5, located aside the camera 1, and electrically connected to the processing unit, herein when the optical lens assembly carries the fingerprint capture platform and the light guide member 3 to move along the sliding rail 4 to a first set location, the optical lens assembly comes into contact with the switch 5 to turn the switch 5 on; and when the optical lens assembly carries the fingerprint capture platform and the light guide member 3 to move along the sliding rail 4 to a second set location, the optical lens assembly is separated from the switch 5 to turn the switch 5 off, thereby achieving conversion between a fingerprint identification function and a terminal photography function.

In an embodiment, the camera 1 may be automatically focused under the control of the processing unit.

The terminal in the structure may be a mobile phone, a tablet computer, a computer, etc., and the fingerprint identification is completed by an identification module in the processing unit.

Figure 5:
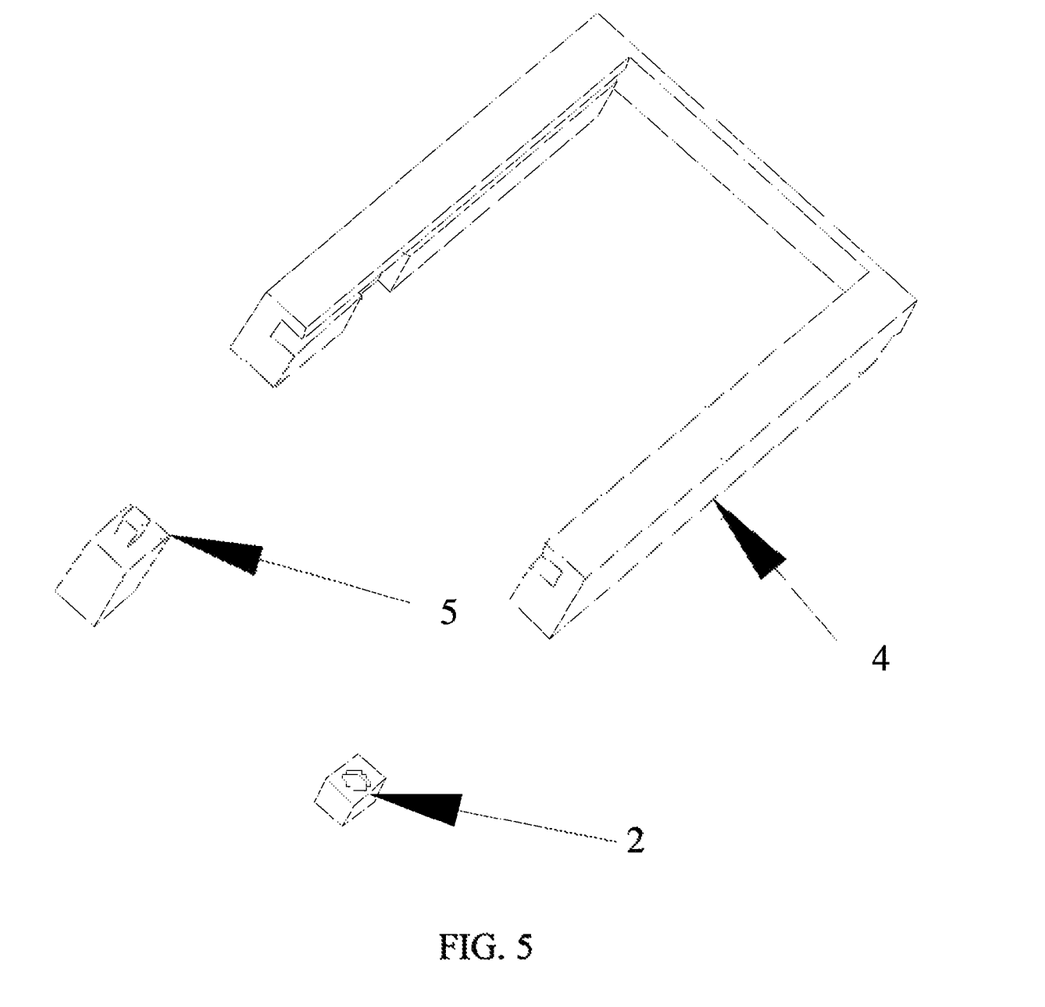
FIG. 5 is an exploded schematic structure diagram of a switch, a sliding rail and a light source in FIG. 1 and FIG. 2.

As shown in FIG. 2 and FIG. 5, the terminal having a fingerprint identification function further includes: a limiting member 6, mounted at an end of the sliding rail 4, to stop the optical lens assembly from slipping off the sliding rail 4.

Alternatively, the switch 5 is a toggle switch, the light source 2 is an LED flashlight, and the limiting member 6 is a limiting plate.

Figure 4:
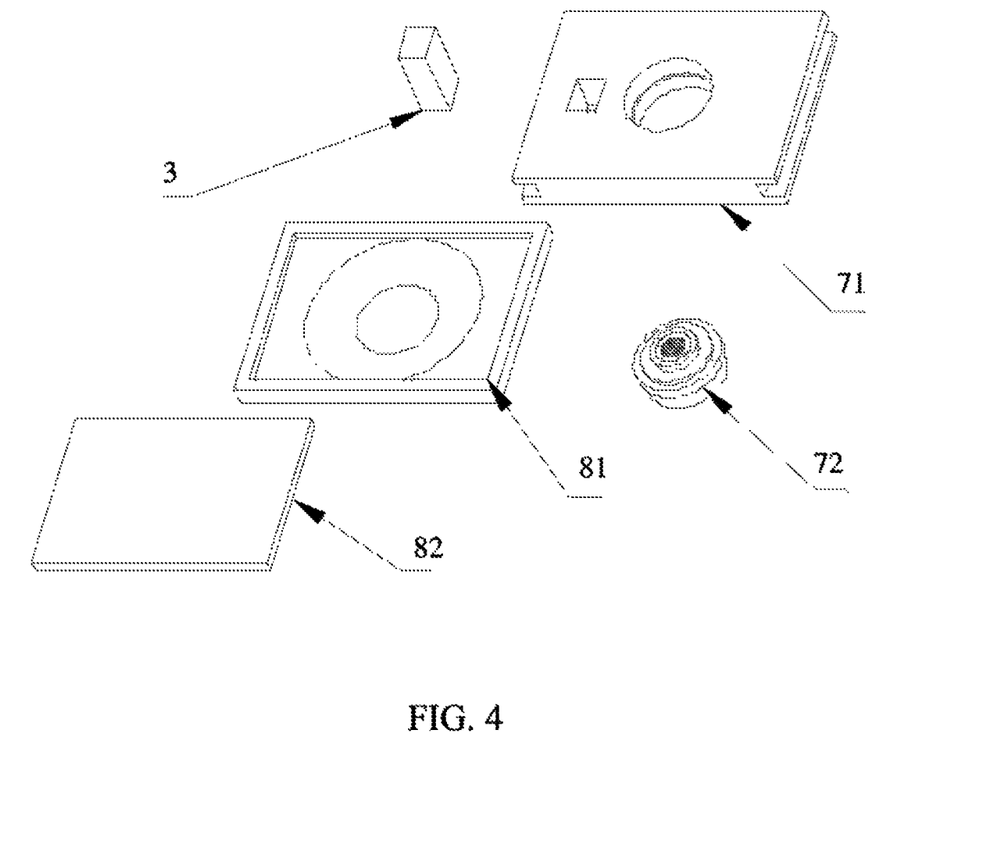
FIG. 4 is an exploded schematic structure diagram of an optical lens assembly and a fingerprint capture platform in FIG. 1 and FIG. 2.

In an embodiment of the present disclosure, as shown in FIG. 3 and FIG. 4, the optical lens assembly includes: a sliding support 71 having a first through-hole, movably mounted on the sliding rail 4; and an optical lens 72, mounted in the first through-hole.

The sliding support 71 and the sliding rail 4 may be fitted by a structure of a T-shaped sliding rail 4 and a T-shaped groove structure, or may be fitted by a structure of an in-line intercalation-tongue and an in-line through-groove, which can achieve the purpose of the present application; and the sliding support 71 is fitted with the sliding rail 4 by a set of opposite ends thereof, and the sliding rail 4 includes two symmetrical parts.

In addition, the fingerprint capture platform includes: a light-guiding platform support 81, mounted on the sliding support 71; and light-guiding platform glass 82, mounted on the platform support 81.

The platform support 81 is provided with a second through-hole, corresponding to the first through-hole.

Herein, the platform glass 82 is optical glass, the optical lens 72 is a wide-angle lens, the first through-hole is cylindrical, the second through-hole is flared, with a large opening end of the flared hole facing a lower surface of the fingerprint capture platform.

To sum up, embodiments of the present disclosure provide the terminal having a fingerprint identification function. An optical lens assembly is added in front of a camera, and the optical lens assembly zooms in with the camera to realize super macro shooting by the camera, so that a finger is placed on a fingerprint capture platform at the front end of the optical lens assembly, and a fingerprint image is shot by exposure compensation on the finger via a light source, so as to enable a processing unit to capture fingerprints and complete follow-up fingerprint identification. That structure is easy to implement, and the cost is low.

In the description herein, the terms "mounted," "connected," "connection," "fixed," etc. should be broadly understood. For example, "connection" may be a fixed connection, a detachable connection, or an integral connection; "connection" may be a direct connection or an indirect connection through an intermediate. Those of ordinary skill in the art can understand the meanings of the above terms herein according to actual conditions.

In the description of the specification, descriptions of the terms "one embodiment", "some embodiments" and the like mean that features, structures, materials, or characteristics described in conjunction with that embodiment or example are included in at least one embodiment or example of the present disclosure. In the present specification, the schematic representation of the above terms does not necessarily refer to the same embodiment or example. Moreover, the described features, structures, materials, or characteristics may be combined in any suitable manner in one or more embodiments or examples.

Although embodiments of the present disclosure are described above, the contents described are embodiments for convenience of understanding of the present disclosure and are not intended to limit the present disclosure. Any person skilled in the art to which the present disclosure pertains may make any modifications and changes in the forms and details of implementation without departing from the spirit and scope disclosed herein, but the scope of patent protection of the present disclosure is still determined by the scope defined by the attached claims.

INDUSTRIAL APPLICABILITY

Embodiments of the present disclosure provide the terminal having a fingerprint identification function, an optical lens assembly zooms in with a camera to realize super macro shooting by the camera, so that a finger is placed on a fingerprint capture platform at the front end of the optical lens assembly, and a fingerprint image is shot by exposure compensation on the finger via a light source, so as to enable a processing unit to capture fingerprints and complete follow-up fingerprint identification. That structure is easy to implement, and the cost is low.

The invention claimed is:

1. A terminal having a fingerprint identification function, comprising:
   a body having a camera and a processing unit, the camera being electrically connected to the processing unit;
   an optical lens assembly, used to change a focal length of the camera, located above the camera, and mounted on the body;
   a light-guiding fingerprint capture platform, located above the optical lens assembly, and used cooperatively with the optical lens assembly;
   a light source, located between the camera and the fingerprint capture platform and aside the camera, a light emitting end of the light source facing the fingerprint capture platform;
   a light guide member, mounted between the fingerprint capture platform and the light source; and
   a sliding rail, located on the body, the optical lens assembly being movably mounted on the sliding rail, the fingerprint capture platform being fixedly mounted on the optical lens assembly, and the light guide member being mounted on the optical lens assembly in a penetration manner, wherein when the optical lens assembly carries the fingerprint capture platform and the light guide member to move along the sliding rail to a first set location, the optical lens assembly and the fingerprint capture platform are located right above the camera, and the light guide member is located right above the light source; and when the optical lens assembly carries the fingerprint capture platform and the light guide member to move along the sliding rail to a second set location, the optical lens assembly and the fingerprint capture platform are located aside a place right above the camera, and the light guide member is located aside a place right above the light source.

2. The terminal having a fingerprint identification function according to claim 1, further comprising:

a switch, located aside the camera, and electrically connected to the processing unit, wherein when the optical lens assembly carries the fingerprint capture platform and the light guide member to move along the sliding rail to a first set location, the optical lens assembly comes into contact with the switch to turn the switch (5) on; and when the optical lens assembly carries the fingerprint capture platform and the light guide member to move along the sliding rail to a second set location, the optical lens assembly is separated from the switch to turn the switch off.

3. The terminal having a fingerprint identification function according to claim 2, further comprising:

a limiting member, mounted at an end of the sliding rail, to stop the optical lens assembly from slipping off the sliding rail.

4. The terminal having a fingerprint identification function according to claim 3, wherein the switch is a toggle switch, the light source is an LED flashlight, and the limiting member is a limiting plate.

5. The terminal having a fingerprint identification function according to claim 1, wherein the optical lens assembly comprises:

a sliding support having a first through-hole, movably mounted on the sliding rail; and an optical lens, mounted in the first through-hole.

6. The terminal having a fingerprint identification function according to claim 5, wherein the fingerprint capture platform comprises:

a light-guiding platform support, mounted on the sliding support; and light-guiding platform glass, mounted on the platform support.

7. The terminal having a fingerprint identification function according to claim 6, wherein the platform support is provided with a second through-hole, corresponding to the first through-hole.

8. The terminal having a fingerprint identification function according to claim 7, wherein the platform glass is optical glass, the optical lens is a wide-angle lens, the first through-hole is cylindrical, and the second through-hole is flared.

9. The terminal having a fingerprint identification function according to claim 2, wherein the optical lens assembly comprises:

a sliding support having a first through-hole, movably mounted on the sliding rail; and an optical lens, mounted in the first through-hole.

10. The terminal having a fingerprint identification function according to claim 9, wherein the fingerprint capture platform comprises:

a light-guiding platform support, mounted on the sliding support; and light-guiding platform glass, mounted on the platform support.

11. The terminal having a fingerprint identification function according to claim 10, wherein the platform support is provided with a second through-hole, corresponding to the first through-hole.

12. The terminal having a fingerprint identification function according to claim 11, wherein the platform glass is optical glass, the optical lens is a wide-angle lens, the first through-hole is cylindrical, and the second through-hole is flared.

13. The terminal having a fingerprint identification function according to claim 3, wherein the optical lens assembly comprises:

a sliding support having a first through-hole, movably mounted on the sliding rail; and an optical lens, mounted in the first through-hole.

14. The terminal having a fingerprint identification function according to claim 13, wherein the fingerprint capture platform comprises:

a light-guiding platform support, mounted on the sliding support; and light-guiding platform glass, mounted on the platform support.

15. The terminal having a fingerprint identification function according to claim 14, wherein the platform support is provided with a second through-hole, corresponding to the first through-hole.

16. The terminal having a fingerprint identification function according to claim 4, wherein the optical lens assembly comprises:

a sliding support having a first through-hole, movably mounted on the sliding rail; and an optical lens, mounted in the first through-hole.

17. The terminal having a fingerprint identification function according to claim 16, wherein the fingerprint capture platform comprises:

a light-guiding platform support, mounted on the sliding support; and light-guiding platform glass, mounted on the platform support.

18. The terminal having a fingerprint identification function according to claim 17, wherein the platform support is provided with a second through-hole, corresponding to the first through-hole.

* * * * *